United States Patent
Nakao et al.

(10) Patent No.: US 8,982,040 B2
(45) Date of Patent: Mar. 17, 2015

(54) LIQUID CRYSTAL DISPLAY DEVICE AND METHOD OF DISPLAYING THE SAME

(75) Inventors: Kenji Nakao, Ishikawa-ken (JP); Toshiyuki Higano, Ishikawa-ken (JP); Jun Hanari, Kanagawa-ken (JP)

(73) Assignee: Japan Display Inc., Tokyo (JP)

( * ) Notice: Subject to any disclaimer, the term of this patent is extended or adjusted under 35 U.S.C. 154(b) by 338 days.

(21) Appl. No.: 13/220,960

(22) Filed: Aug. 30, 2011

(65) Prior Publication Data

US 2012/0057088 A1 Mar. 8, 2012

(30) Foreign Application Priority Data

Sep. 8, 2010 (JP) .................................. 2010-201451

(51) Int. Cl.
| | | |
|---|---|---|
| G09G 3/36 | (2006.01) | |
| H04N 13/04 | (2006.01) | |
| G09G 3/00 | (2006.01) | |
| G09G 3/34 | (2006.01) | |

(52) U.S. Cl.
CPC .......... *H04N 13/0402* (2013.01); *G09G 3/003* (2013.01); *G09G 3/3406* (2013.01); *G09G 2300/0491* (2013.01); *G09G 2310/0251* (2013.01); *G09G 2310/08* (2013.01); *G09G 2320/0261* (2013.01); *G09G 2330/021* (2013.01)
USPC ...................................................... 345/102

(58) Field of Classification Search
None
See application file for complete search history.

(56) References Cited

U.S. PATENT DOCUMENTS

| | | | |
|---|---|---|---|
| 8,022,922 B2 * | 9/2011 | Kang | 345/102 |
| 8,848,041 B2 * | 9/2014 | Park et al. | 348/51 |
| 2004/0124764 A1 * | 7/2004 | Suzuki et al. | 313/498 |
| 2007/0035555 A1 * | 2/2007 | Tsukagoshi et al. | 345/589 |
| 2007/0242068 A1 * | 10/2007 | Han et al. | 345/427 |
| 2008/0074568 A1 | 3/2008 | Tanaka et al. | |
| 2008/0291152 A1 * | 11/2008 | Nakao et al. | 345/102 |
| 2008/0297695 A1 * | 12/2008 | Sekiguchi et al. | 349/65 |
| 2009/0066687 A1 * | 3/2009 | Oke et al. | 345/214 |
| 2010/0079366 A1 * | 4/2010 | Lin et al. | 345/102 |
| 2010/0128201 A1 * | 5/2010 | Lee | 349/62 |
| 2011/0134115 A1 | 6/2011 | Araki et al. | |
| 2012/0105508 A1 * | 5/2012 | Masuda | 345/690 |

FOREIGN PATENT DOCUMENTS

| | | |
|---|---|---|
| JP | 5-107663 | 4/1993 |
| JP | 10-161061 | 6/1998 |

* cited by examiner

*Primary Examiner* — Kent Chang
*Assistant Examiner* — Nathan Brittingham
(74) *Attorney, Agent, or Firm* — Oblon, McClelland, Maier & Neustadt, L.L.P.

(57) ABSTRACT

In one embodiment, an array substrate includes a plurality of gate lines extending in a column direction. A lighting device includes a first lighting unit, a second lighting unit, and a lighting driver to light on and light off the first and second lighting units independently. The first lighting unit includes a first light source arranged on a scanning starting side of the gate lines. The second lighting unit includes a second light source arranged on a scanning terminating side of the gate lines. The lighting driver lights on the second lighting unit after lighting on the first lighting unit, and lights off the second lighting unit after lighting off the first lighting unit in a period between a starting time to write a first signal and a finishing time to write a second signal in the plurality of pixels.

9 Claims, 8 Drawing Sheets

LIQUID CRYSTAL DISPLAY DEVICE AND METHOD OF DISPLAYING THE SAME

CROSS-REFERENCE TO RELATED APPLICATION

This application is based upon and claims the benefit of priority from Japanese Patent Application No. P2010-201451, filed Sep. 8, 2010, the entire contents of which are incorporated herein by reference.

FIELD

Embodiments described herein relate generally to a liquid crystal display device and a method of displaying the same.

BACKGROUND

The liquid crystal display device is widely used taking advantages, such as a light weight, a thin shape, and low power consumption, as the displays for a personal computer, an information personal digital assistant (PDA), a television set, and a car-navigation system.

In recent years, research of new liquid crystal display devices are made for a three-dimensional display (3D) or a screen display capable of simultaneously displaying different pictures for some users looking at the same screen from different directions. For example, a display device having double screens for an automobile, in which the images are simultaneously visible from a driver's seat and a front passenger seat respectively, and the 3D display device for carrying out the 3D display by displaying a right image and a left image by turns, are proposed respectively.

As a technology for enabling such 3D display, a parallax barrier system is known, for example.

In the liquid crystal display device adopting the parallax barrier system, a plurality of pixels for right eye and left eye is respectively formed in a liquid crystal display panel. A parallax barrier layer is formed so that one of the lights which penetrate and emit through the pixels can be watched from an oblique direction. In addition, a lenticular lens can be used as the parallax barrier layer to improve a directional characteristics.

However, in the above parallax barrier system, since it is necessary to prepare the pixels for right eye and left eye different from each other, the surface imagery of the displayed image falls to one half of the actual number of pixels of the display panel.

On the other hand, a system for changing the directional characteristics of light is proposed, in which the light is emitted toward respective right and left directions from a back light by using a time sharing drive. According to this system, it is possible to display a plurality of images simultaneously in one screen or the 3D images without decreasing neither the surface imagery nor an aperture ratio.

In order to display different images by carrying out the time sharing of one-frame period, for example, it is desirable to use liquid crystals with a high response speed needed for a moving image while achieving a display with a wide viewing angle, such as an OCB (Optically Compensated Bend) mode liquid crystal. In the liquid crystal display device adopting the OCB mode liquid crystal, liquid crystal molecules are prevented from an inverse-transition from a bend alignment state to a splay alignment state by impressing an image signal and an inverse-transition prevention signal to the liquid crystal layer periodically.

Conventionally, in the liquid crystal display device adopting the OCB mode liquid crystal, a technology of performing a black insertion drive which raises a display quality of the moving image and prevents the inverse transition is proposed by writing a signal corresponding to a black display as the inverse-transition prevention signal.

However, when a two-dimensional (2D) image is displayed with the liquid crystal display device which performs the time sharing 3D display by switching the light direction from a back light, following unfavorable cases may be caused: the uniformity of luminosity becomes low, the electric power efficiency is bad, and the brightness runs short.

For example, in the liquid crystal display device adopting the OCB mode liquid crystal, when the back light for switching the light directivity is made always turn on, the uniformity of the luminosity is high. However, since the back light is turned on also in the period when performing the black display in the liquid crystal display panel, it was difficult to improve the electric power efficiency.

Moreover, when the back light is turned on after the image signal writing has completed in the full screen, the electric power efficiency becomes high because the back light is switched off in the period when performing the black display. However, a luminosity inclination resulting from the response time of the liquid crystal may occur. For example, in the pixel in which a white image signal was written first, the white image becomes comparatively bright because the back light is turned on after predetermined time has passed since the liquid crystal responded. However, in the pixel in which the white image signal was written at the end, the white image becomes dark because the back light turns on immediately after the liquid crystal has responded without completion of the response of the liquid crystal.

If the back light is turned on at the timing when the writing of the pixel signals ends for half of the panel, in addition to the above luminosity inclination resulting from the response time of the liquid crystal, the luminosity inclination resulting from displaying the black image is also superimposed, and a big luminosity inclination occurs.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

A liquid crystal display device and a method of displaying the same according to an exemplary embodiment of the present invention will now be described with reference to the accompanying drawings wherein the same or like reference numerals designate the same or corresponding portions throughout the several views.

According to one embodiment, a liquid crystal display device includes a display panel including an array substrate, a counter substrate, a liquid crystal layer held therebetween, and a plurality of pixels arranged in a matrix; and a lighting device to illuminate the display panel; wherein the array substrate includes a plurality of gate lines extending in a column direction and a plurality of source lines in a row direction along which the plurality of pixels are arranged, and a driving device for sequentially driving the gate lines, the lighting device includes a first lighting unit, a second lighting unit, and a lighting driver to light on and light off the first and second lighting units independently, the first lighting unit includes a first light source arranged on a scanning starting side of the gate lines and a first light guide plate for emitting light from the first light source to the display panel, the second lighting unit includes a second light source arranged on a scanning terminating side of the gate lines and a second light guide plate for emitting light from the second light source to the display panel, and the lighting driver lights on the second lighting unit after lighting on the first lighting unit, and lights off the second lighting unit after lighting off the first lighting unit in a period between a starting time to write a first signal and a finishing time to write a second signal in the plurality of pixels.

Hereafter, the liquid crystal display device according to an embodiment is explained with reference to drawings. Although in the following embodiment, an example of the case where a 3D display and a 2D display are performed, the embodiment is not limited to this. The display device may be a liquid crystal display device having double screens in which the different images on right-hand side and left-hand side toward the panel are visible simultaneously.

Figure 1:
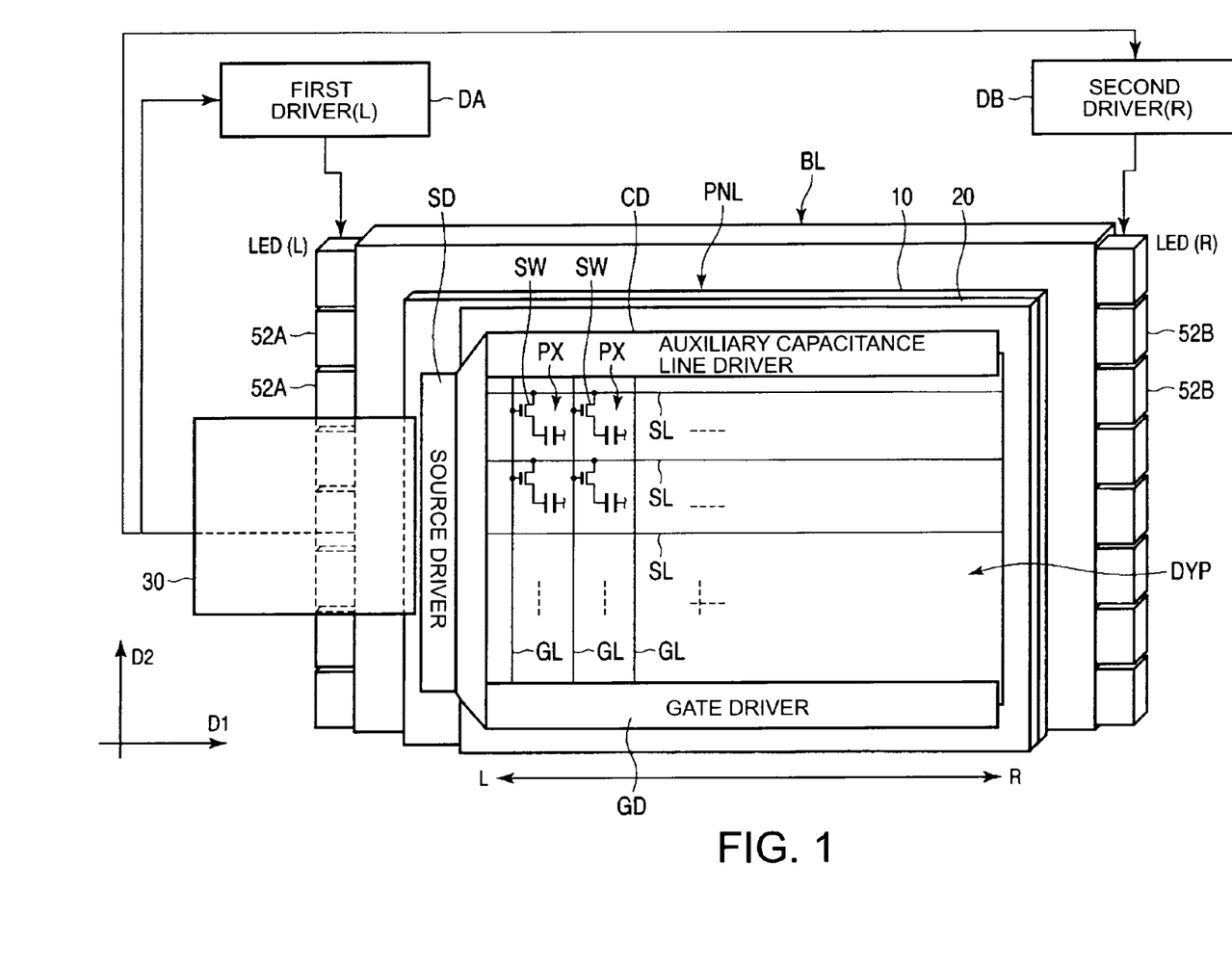
FIG. 1 is a figure schematically showing an example of a structure of a liquid crystal display device according to an embodiment.

One example of a structure of the liquid crystal display device according to the first embodiment is schematically shown in FIG. 1. The liquid crystal display device according to this embodiment is equipped with a liquid crystal display panel PNL and a back light BL which illuminates the liquid crystal display panel PNL.

The liquid crystal display panel PNL includes an array substrate 10, a counter substrate 20 arranged opposing the array substrate 10, a liquid crystal layer held between the array substrate 10 and the counter substrate 20, a display region DYP formed of pixels PX arranged in the shape of a matrix, and a wiring substrate 30 electrically connected with the end of the array substrate 10. The liquid crystal display device according to this embodiment is a 4-inches WVGA liquid crystal display device, for example.

The array substrate 10 includes a plurality of pixel electrodes (not shown) arranged in the shape of a matrix corresponding to each pixel PX, a plurality of gate lines GL arranged along with column lines of the pixel electrodes, a plurality of source lines SL arranged along with row lines of the pixel electrodes, a pixel switch SW arranged near an intersection where the gate line GL and the source line SL cross, and a driver circuit. The driver circuit includes a gate driver SD which drives the plurality of gate lines GL, a source driver which drives the plurality of source lines SL, and an auxiliary capacitance line driver CD which drives the auxiliary capacitance lines (not illustrated). The pixel electrode is formed, for example, by a transparent electric conductive material, such as ITO (Indium Tin Oxide).

The source driver SD is equipped with a controller to control the operations of the source driver SD, the gate driver GD, and the auxiliary capacitance line driver CD. The controller is controlled by control signals received through the wiring substrate 30 from an outside signal source.

The pixel switch SW is formed of a poly-silicon thin film transistor (TFT), for example. The gate electrode is electrically connected with the corresponding gate line GL (or formed in one), the source electrode is electrically connected with the corresponding source line SL (or formed in one), and the drain electrode is electrically connected with the corresponding pixel electrode (or formed in one).

The gate driver GD makes conductive the corresponding pixel switches SW by driving the plurality of gate lines GL one by one from the L side to the R side. The source driver SD supplies the respective signals corresponding to the plurality of source lines SL, and impresses the signals to the pixel electrodes through the pixel switches SW. The auxiliary capacitance line driver CD impresses an auxiliary capacitance voltage to the auxiliary capacitance line, and combines the auxiliary capacitance of a predetermined amount with a liquid crystal capacitance.

In the liquid crystal display device according to this embodiment, 800 gate lines GL and 480×3 (RGB) source lines SL are used. Moreover, the gate driver GD and the auxiliary capacitance line driver CD are built in the array substrate 10 using poly-silicon TFTs.

The counter substrate 20 is equipped with a counter electrode arranged opposing the plurality of pixel electrodes. The counter electrode is formed, for example, by transparent conductive materials, such as ITO. A counter voltage is impressed to the counter electrode from the counter electrode drive circuit (not shown).

A pair of alignment films (not shown) is arranged on the plurality of pixel electrodes and the counter electrode, respectively. Predetermined orientation treatment is performed to the surfaces of the pair of alignment films. In this embodiment, a rubbing treatment is made to both surfaces in a parallel direction each other.

An initial alignment direction of the liquid crystal molecules of the liquid crystal layer is specified by the rubbing direction of the alignment film, and the alignment state is controlled by a voltage supplied between the pixel electrode and the counter electrode.

In addition, in order to display different images by the time sharing of the one-frame period, it is desirable to use a liquid crystal with a high response time. In this embodiment, the OCB mode liquid crystal which can realize the display of a wide viewing angle while having a high-speed liquid crystal response needed for a moving image, is adopted. The gate driver GD and the source driver SD are controlled by the controller implemented in the source driver SD, and prevents the liquid crystal molecules from the inverse transition from the bend alignment state to the splay alignment state by impressing periodically the inverse transition prevention signal of a comparatively high voltage to the liquid crystal layer. In the liquid crystal display device according this embodiment, the voltage corresponding to a black display is impressed to the liquid crystal layer as the inverse transition prevention signal (black insertion), while raising the quality of the display, such as the moving image.

Figure 2:
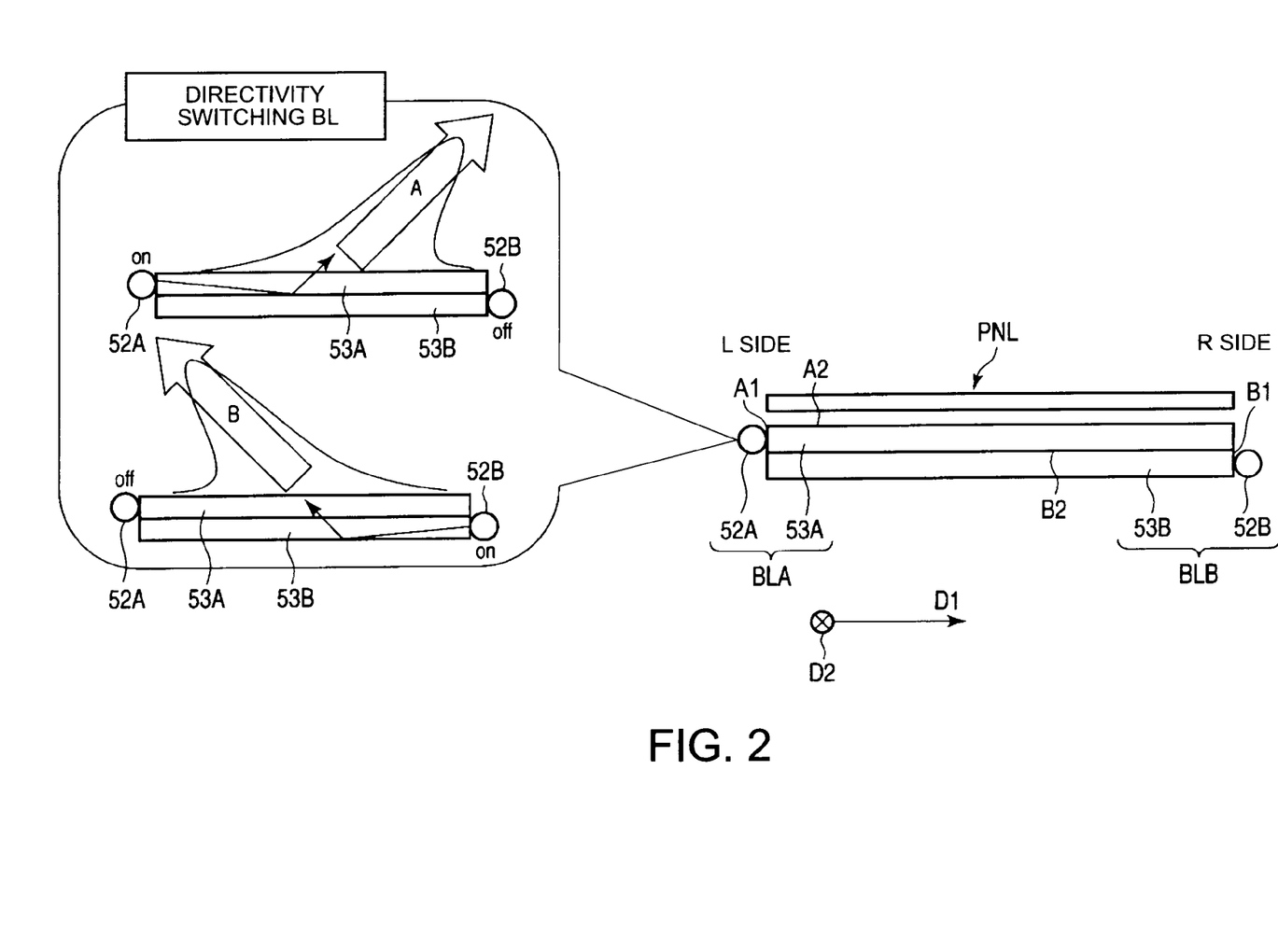
FIG. 2 is a figure for explaining one example of a structure of a back light of the liquid crystal display device shown in FIG. 1.

An example of a structure of the back light BL is schematically shown in FIG. 2. The back light BL includes a first back light BLA that emits a light in a first direction A, a second back light BLB that emits a light in a second direction B, and a lighting driver. The first back light BLA is equipped with a first light source 52A and a first light guide plate 53A. The second back light BLB is equipped with a second light source 52B and a second light guide plate 53B. The lighting driver has a first driver DA which drives the first light source 52A, and a second driver DB that drives the second light source 52B. In addition, the first light guide plate 53A and the second light guide plate 53B may be formed by a common light guide plate as shown in FIG. 1. Moreover, the control of the back light BL is performed by the controller as mentioned-above. Here, the first light source 52A corresponds to a light source formed on the scan starting side with respect to the scan direction (LR direction) of the plurality of gate lines GL, and the first light guide plate 53B and the first back light BLA are arranged corresponding to the first light source 52A. On the other hand, the second light source 52B, the second light guide plate 53B and the second back light BLB are arranged corresponding to the scan terminating side.

The back light BL is arranged on a back side of the liquid crystal display panel PNL (array substrate 10 side) so that a first back light BLA illuminates the scanning end side (R side) with respect to the scanning direction (the LR direction) of the plurality of gate lines GL, and that a second back light BLB illuminates the scanning start side (L side) in the scanning direction (the LR direction).

The first light guide plate 53A is formed approximately in a rectangular parallelepiped form equipped with an optical incident plane A1 and an optical emitting plane A2. In addition, only the optical incident plane A1 may be formed thicker to make an incident light efficiency is made high. The first light source 52A is formed of light emitting diodes, for example, and a plurality of first light sources 52A are arranged side by side along the optical incident plane A1 so that the light is emitted toward the optical incident plane A1. The light which enters into the first light guide plate 53A from the optical incident plane A1 is led to an optical emitting plane A2, and is emitted from the optical emitting plane A2 toward the first direction A.

Figure 10:
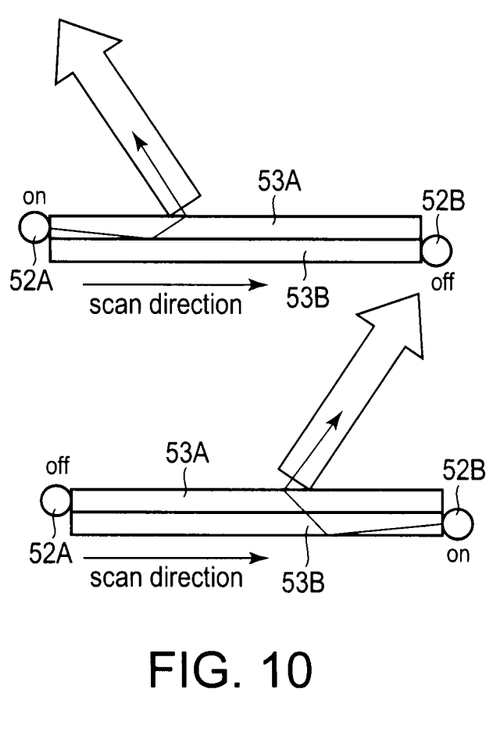
FIG. 10 is a figure for explaining other example of the structure of the back light of the liquid crystal display device shown in FIG. 1.

The second light guide plate 53B is formed in an approximately rectangular parallelepiped form equipped with an optical incident plane B1 and an optical emitting plane B2. The second light source 52B is formed of light emitting diodes, for example, and a plurality of second light sources 52B are arranged side by side over the optical incident plane B1 so that the light is emitted toward the optical incident plane B1. The light which enters into the second light guide plate 53B from the optical incident plane B1 is led to the optical emitting plane B2, and is emitted from the optical emitting plane B2 toward the second direction B. Moreover, it is also possible to emit the radiated light toward the light source side by designing the light guide plate and a prism sheet arranged on the light guide plate as shown in FIG. 10.

The first direction A is a direction rotated from a thickness direction of the liquid crystal display panel PNL, which intersects perpendicularly the direction D1 and the direction D2, toward the right (R) direction. Similarly, a second direction B is a direction rotated from a thickness direction of the liquid crystal display panel PNL toward the left (L) direction.

Positional alignment of the back light BL and the liquid crystal display panel PNL is carried out as follows. The first light source 52A is arranged on the left-hand side of the liquid crystal display panel PNL (a scanning start side in the scanning direction of the plurality of gate lines GL, that is, on the L side in the direction D1 along which the source lines SL extend) so as to line in the direction D2 along which the gate lines GL extend. The second light source 52B is arranged on the right-hand side of the liquid crystal display panel PNL (a scanning end side in the scanning direction of the plurality of gate lines GL, that is, on the R side in the direction D1 along which the source lines SL extend) so as to line in the direction D2 along which the gate lines GL extend.

When a user looks at the display region DYP toward the liquid crystal display panel PNL, the light emitted from the first back light BLA and penetrating the liquid crystal display panel PNL is sighted by the user's right eye, and the light emitted from the second back light BLB and penetrating the liquid crystal display panel PNL is sighted by the user's left eye. Of course, the relationship between the left and the right is reversed if the panel is arranged in reverse in the left-right direction.

In addition, one example of a schematic structure of the liquid crystal display device is shown in FIG. 2. Optical elements to adjust the directivity of lights, such as a collimate lens and a prism film, can be provided suitably between the liquid crystal display panel PNL and the back light BL. Since the 3D display characteristics may be reduced, a diffusion sheet is not used in principle.

Figure 3:
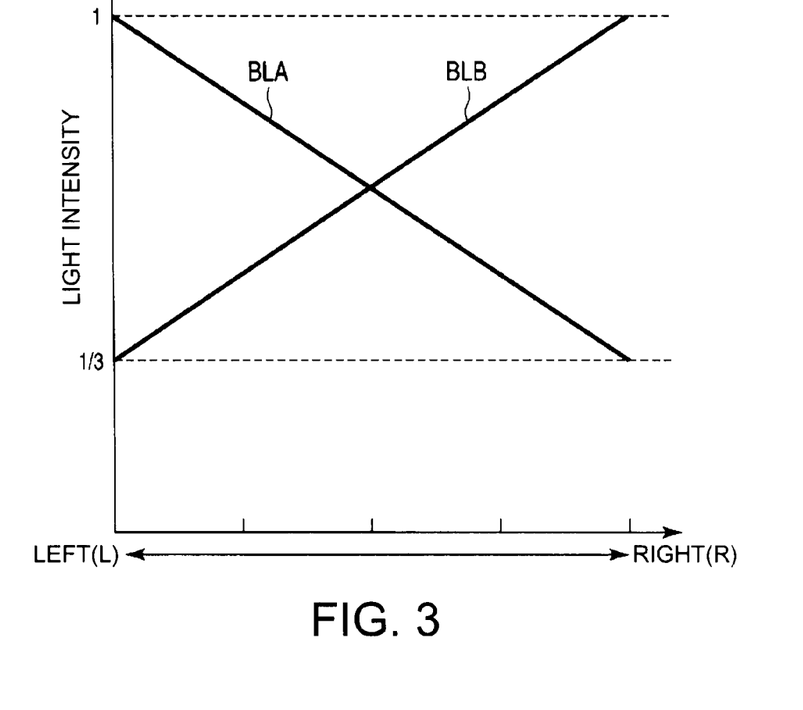
FIG. 3 is a figure for explaining an example of the characteristics of the light intensity of the light emitted from the back light shown in FIG. 2.

In this embodiment, the light intensity of the back light BL is made to incline in a horizontal direction (direction D1 along which the source lines SL extend). An example of the light intensity of the first back light BLA and the second back light BLB is shown in FIG. 3. The first back light BLA has a stronger light intensity on the left-hand side of the liquid crystal display panel PNL, i.e., a light incident side, and is constituted so that the light intensity of the right-hand side becomes weaker gradually, practically more than ⅓ and less than ½ compare with that of the left-hand side. The second back light BLB has a stronger light intensity on the right-hand side of the liquid crystal display panel PNL, i.e., the light incident side, and is constituted so that the light intensity of the left-hand side becomes weaker gradually, practically more than ⅓ and less than ½ compare with that of the right-hand side. In addition, the light intensity of the back light BL is defined by luminosity within a range of the direction of ±4 degrees with respect to a normal line of the panel. Here, the luminosity becomes higher at the incident side and lower at the opposite side.

According to the inclination of the light intensity as mentioned-above, the reflection of the emitted light from the first back light BLA is suppressed at the right-hand side end.

Similarly, the reflection of the emitted light from the second back light BLB is suppressed at the left-hand side end. For example, when the light emitted from the first back light BLA is reflected at the right-hand side end, the right-hand side of the liquid crystal display panel PNL is illuminated like the "ON" time of the second back light BLB, and the display quality of the 3D display may fall. On the other hand, in this embodiment, since the light intensity of the first back light BLA and the second back light BLB is formed so that the light intensity inclines, it becomes possible to suppress that the display quality of 3D display falls.

When performing the 3D display in the above-mentioned liquid crystal display device, the first light source 52A is turned on in the period when the image for right eye is displayed on the liquid crystal display panel PNL, and the second light source 52B is turned on in the period when the image for left eye is displayed on the liquid crystal display panel PNL.

Thus, the left-and-right parallax images can be led to left eye and right eye, respectively by sequentially displaying the right-and-left parallax images on the liquid crystal display panel PNL one by one by the time sharing, while switching the directivity of the light source in synchronizing with the alternating display.

In the liquid crystal display device according this embodiment as mentioned-above, the 3D display is possible. However, if the first back light BLA and the second back light BLB are simultaneously turned on, the 2D display can be performed. In most of the 3D display devices, the 3D images are not displayed always. Instead, the 3D display devices are changed to the 3D display mode only when displaying the 3D image, while the 2D images are ordinary displayed.

In this embodiment, the lighting driver turns on the second back light BLA after turning on the first back light BLB, and then the second back light BLA is turned off after switching off the first back light BLB in a period after starting the writing of the image signals for the 2D display in the plurality of pixels PX until the black insertion is completed. It is the feature that the order of the lighting of the back light coincides with the scanning direction of the gate lines GL in the 2D display.

When performing the 2D display, the driving frequency of the gate driver GD may be 60 Hz or higher than 60 Hz. In this embodiment, since a flicker of the black insertion may be caused, the driving frequency of 80 Hz is used for the gate driver GD to display the 2D images. In addition, one of 75 Hz, 90 Hz, and 120 Hz may be used as the driving frequency of the gate driver GD. In addition, in the liquid crystal display device according to this embodiment, since the resolution of the images does not change depending on the 2D display and the 3D display, the display quality of neither the 2D display nor the 3D display is reduced.

Figure 4:
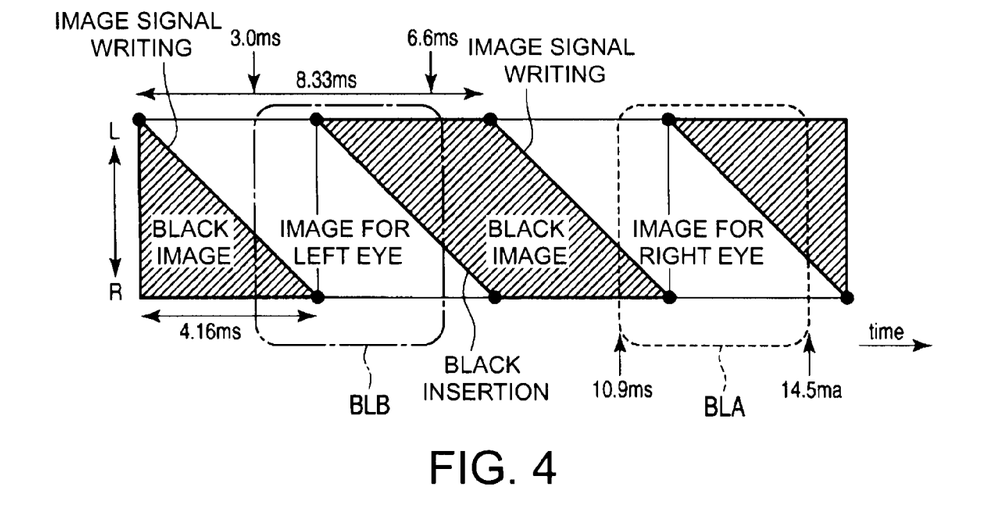
FIG. 4 is a figure for explaining respective examples of a liquid crystal display panel and the drive timing of the back light at the time of performing a 3D display in the liquid crystal display device according to the embodiment.

FIG. 4 shows one example of the image display and the lighting timing of the back light BL when performing the 3D display in the above-mentioned liquid crystal display device. Here, it takes 4.16 ms to write the image signal in the display region DYP of the WVGA type display device, and also takes the same period 4.16 ms to write the inverse transition prevention signal (the black insertion).

In the case shown in FIG. 4, the liquid crystal display panel PNL displays the image for left eye by writing the image signal for left eye in the pixel electrode in the beginning of one-frame period of 8.33 ms, and then displays a black image by writing the signal corresponding to the black display in the pixel electrode continuously. At this time, the second back light BLB is driven so that the light is switched on in the period between 3.0 ms to 6.6 ms.

Then, the liquid crystal display panel PNL displays the image for right eye by writing the image signal for right eye in the pixel electrode in the beginning of next one-frame period, and then displays a black image by writing the signal corresponding to the black display in the pixel electrode continuously. At this time, the first back light BLA is driven so that the light is switched on in the period between 10.9 ms to 14.5 ms.

In addition, in the case shown in FIG. 4, since it takes 8.3 ms, i.e., one-frame period in the driving frequency of 120 Hz, to perform the image signal writing and the black insertion, it was difficult to secure a holding period.

When the first back light BLA and the second back light BLB are made to turn on by turns as mentioned-above at the time of the 3D display, it became possible to suppress the luminosity inclination within 30%, in which the display is bright in the central portion and is dark on the right-and-left side (up-and-down in FIG. 4) of the display portion DYP. That is, when the luminosity of the bright portion is made into approximately 100%, the luminosity of the portion which is dark became approximately 70%. In addition, when the lighting period of each of the back lights BLA and BLB is extended from the above-mentioned period, though the luminosity inclination became large, the display became bright. If the lighting period of each of the back lights BLA and BLB is made shorter than the above-mentioned period, though it becomes dark, the homogeneity becomes good (the luminosity inclination became small).

Figure 5:
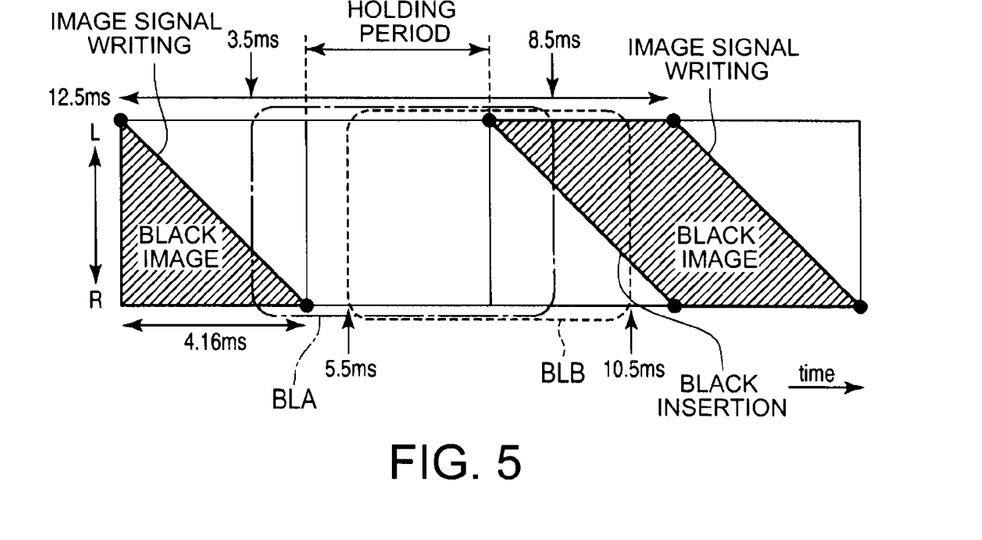
FIG. 5 is a figure for explaining respective examples of the liquid crystal display panel and the drive timing of the back light at the time of performing a 2D display in the liquid crystal display device according to the embodiment.

FIG. 5 shows one example of the image display and the lighting timing of the back light BL when performing the 2D display in the above-mentioned liquid crystal display device. Here, the holding time of approximately 4 ms could be obtained even if it respectively takes 4.16 ms for the writing of the black image signal and the pixel signal in the display region DYP in case of the driving frequency of 80 Hz.

As shown in FIG. 5, in the liquid crystal display device according to this embodiment, the lighting timing of the first back light BLA and the second back light BLB is shifted each other. Here, since the scanning direction of the gate lines GL is set as the horizontal direction (direction D1) of the display region DYP, the up-and-down direction corresponds to the horizontal direction (direction D1) of the display region DYP in FIG. 5.

First, in the one-frame period of 12.5 ms, after the liquid crystal display panel PNL displays an image by image signals written in the pixel electrode for a beginning period of 4.16 ms, and holds the image for approximately 4 ms. Then, the liquid crystal display panel PNL displays a black image based on the signals corresponding to the black display which are written in the pixel electrode for 4.16 ms.

In the back light BL, the first back light BLA is turned on during a period from 3.5 ms to 8.5 ms, and the second back light BLB is turned on during a period from 5.5 ms to 10.5 ms in one-frame period.

In this embodiment, as mentioned-above, the raising in electric power efficiency and the reduction of the luminosity inclination are realized by shifting the lighting timing of the first back light BLA and the second back light BLB, respectively.

If the lighting timing of the first back light BLA and the second back light BLB is shifted as mentioned-above, the reduction of the luminosity inclination can be controlled. Furthermore, in this embodiment, it is made possible to reduce the luminosity inclination by making the light intensity of the first back light BLA and the second back light BLB incline beforehand.

As mentioned-above, in the liquid crystal display device according to this embodiment, even in the 2D display, it becomes possible to supply the liquid crystal display device which achieves a high quality display and low power consumption.

Next, the liquid crystal display device according to the second embodiment is explained with reference to drawings. In addition, in the following explanation, the same marks are denoted for the same elements as the liquid crystal display device according the above-mentioned first embodiment, and explanation is omitted. In the liquid crystal display device according to this embodiment, a longer time than 4.16 ms is needed to write the image signals for right eye and left eye and the signal corresponding to the black display, respectively.

Figure 6:
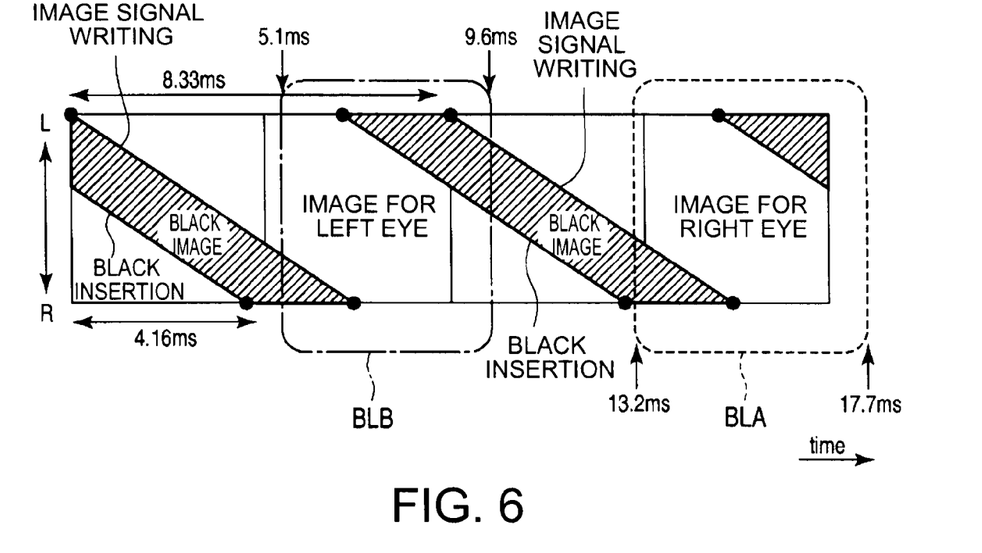
FIG. 6 is a figure for explaining other examples of the liquid crystal display panel and the back light at the time of performing the 3D display in the liquid crystal display device according to the embodiment.

FIG. 6 shows an example of the image display and the lighting timing of the back light BL when performing the 3D display in the liquid crystal display device according to this embodiment. First, in the first period of one-frame period of 8.33 ms, the liquid crystal display panel PNL displays an image for left eye by image signals written in the pixel electrode, and continuously displays a black image by writing black image signals. At this time, the second back light BLB is driven so that the light is switched on during a period from 5.1 ms to 9.6 ms.

Then, in the first period of next one-frame period, the liquid crystal display panel PNL displays an image for right eye by image signals written in the pixel electrode, and displays a black image by black image signals written in the pixel electrode continuously. At this time, the first back light BLA is driven so that the light is switched on during a period from 13.2 ms to 17.7 ms.

Figure 7:
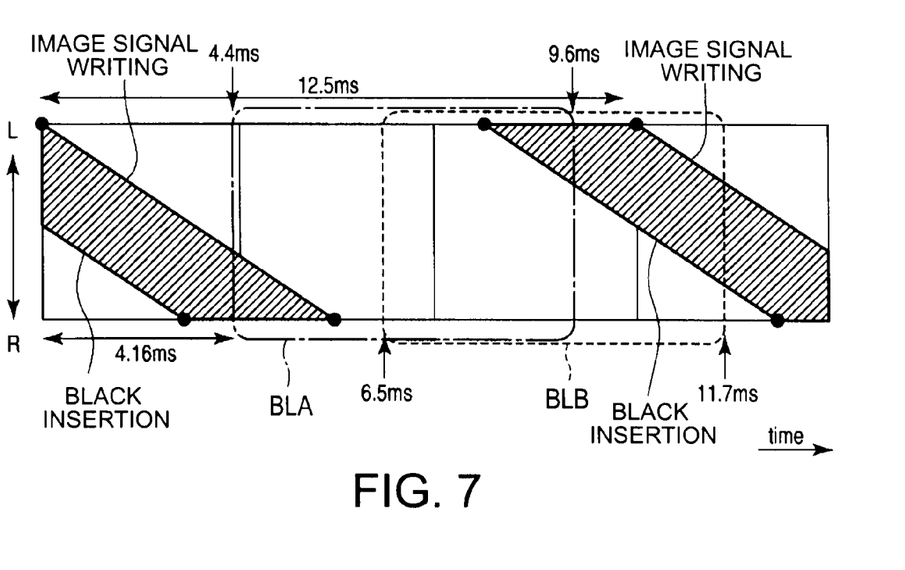
FIG. 7 is a figure for explaining other examples of the liquid crystal display panel and the back light at the time of performing the 2D display in the liquid crystal display device according to the embodiment.

FIG. 7 shows an example of the image display and the lighting timing of the back light BL when performing the 2D display in the liquid crystal display device according to this embodiment. As shown in FIG. 7, in the liquid crystal display device according to this embodiment, the lighting timing of the first back light BLA and the second back light BLB is shifted.

First, in one-frame period of 12.5 ms, after an image has been displayed by image signals written in the pixel electrode, and then the image is held for a predetermined period. Further, the liquid crystal display panel PNL displays a black image by the signal corresponding to the black display written in the pixel electrode.

In the back light BL, the first back light BLA is turned on during a period from 4.4 ms to 9.6 ms, and the second back light BLB is turned on during a period from 6.5 ms to 11.7 ms in one-frame period.

In this embodiment, the raising of electric power efficiency and the reduction of the luminosity inclination are achieved as mentioned-above by shifting the lighting time of the first back light BLA and the second back light BLB.

As mentioned above, it becomes possible to suppress the reduction of the luminosity inclination by shifting the lighting time of the first back light BLA and the second back light BLB. Moreover, in this embodiment, it is made possible to reduce the luminosity inclination further by making the light intensity of the first back light BLA and the second back light BLB incline beforehand.

As mentioned-above, in the liquid crystal display device according to this embodiment, it becomes possible to supply the liquid crystal display device which achieves a high quality display and low power consumption even in the 2D display.

Next, a liquid crystal display device according to a first comparative example is explained.

Figure 8:
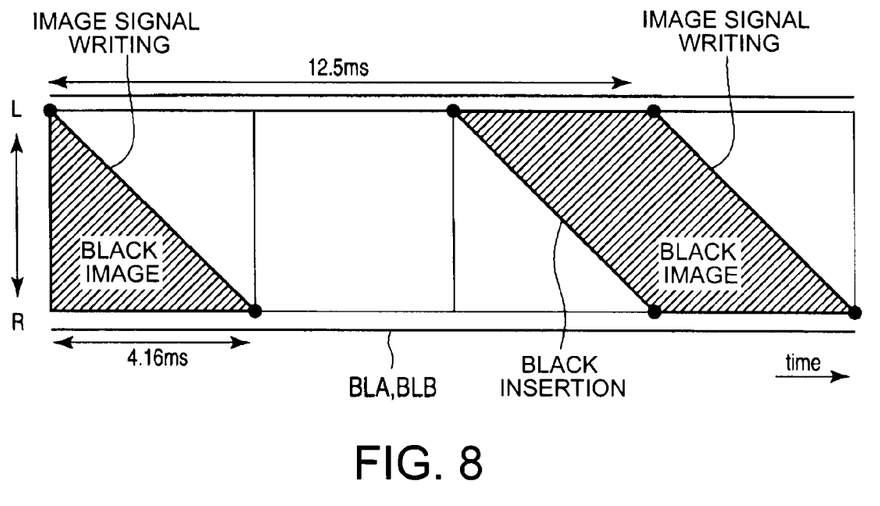
FIG. 8 is a figure for explaining a first comparative example of the liquid crystal display panel and the drive timing of the back light at the time of performing the 2D display in the liquid crystal display device.

FIG. 8 shows an example of the image display and the lighting timing of the back light BL when performing the 2D display according to a first comparative example.

In this comparative example, the image signal writing operation and the black insertion operation are the same as those of the liquid crystal display device according to the above-mentioned first embodiment. In this comparative example, the back light BL is turned on in the first back light BLA and the second back light BLB always. In this case, although the luminosity inclination was not generated, since the back light BL was turned on also in the period when the liquid crystal display panel PNL performs the black display, it was difficult to reduce the power consumption.

Next, the display device according to a second comparative example is explained.

Figure 9:
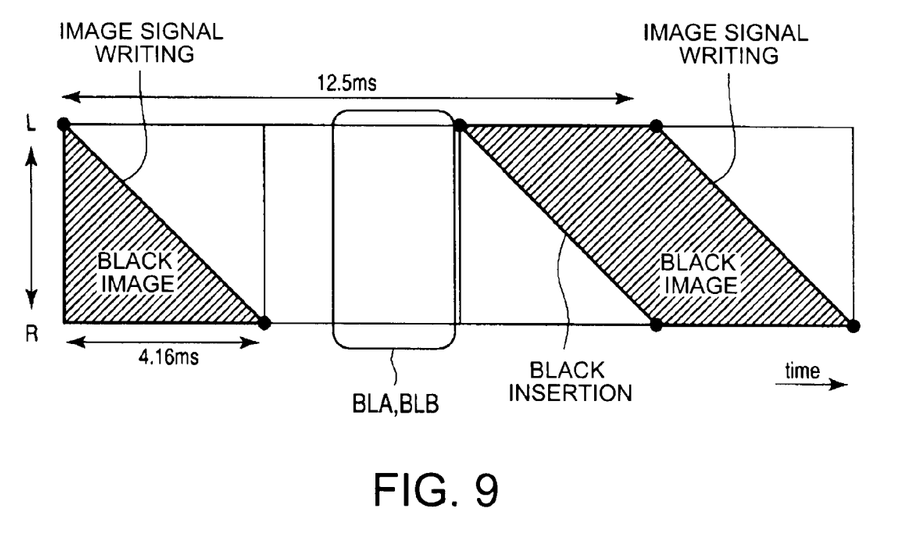
FIG. 9 is a figure for explaining a second comparative example of the liquid crystal display panel and the drive timing of the back light at the time of performing the 2D display in the liquid crystal display device.

FIG. 9 shows an example of the image display and the lighting timing of the back light BL when performing the 2D display according to a second comparative example.

In this comparative example, the image signal writing operation and the black insertion operation of the liquid crystal display panel PNL are the same as those of the liquid crystal display device according to the above-mentioned first embodiment. In the back light BL according to this comparative example, the first back light BLA and the second back light BLB are turned on simultaneously in the holding period of the image signal. In this case, since the back light BL is switched off in the period when the liquid crystal display panel PNL is performing the black display, the power consumption can be reduced. However, since there is a limitation in the number of the mounted light emitting diodes, the brightness runs short.

Moreover, since the back light BL is switched off in the period when the liquid crystal display panel PNL is performing the black display, the luminosity inclination could be suppressed small. However, the luminosity inclination was caused depending on the liquid crystal response as mentioned-above.

Like the above first and second comparative examples, if the first back light BLA and the second back light BLB are made to turn on at the same timing, there is a trade-off between the luminosity inclination and the electric power efficiency. That is, when one characteristics is good, another characteristics becomes worse.

On the other hand, according to the above-mentioned first and second embodiments, it becomes possible to supply the liquid crystal display device which can achieve the good display characteristics and the low power consumption even when the 2D images are displayed.

Figure 11:
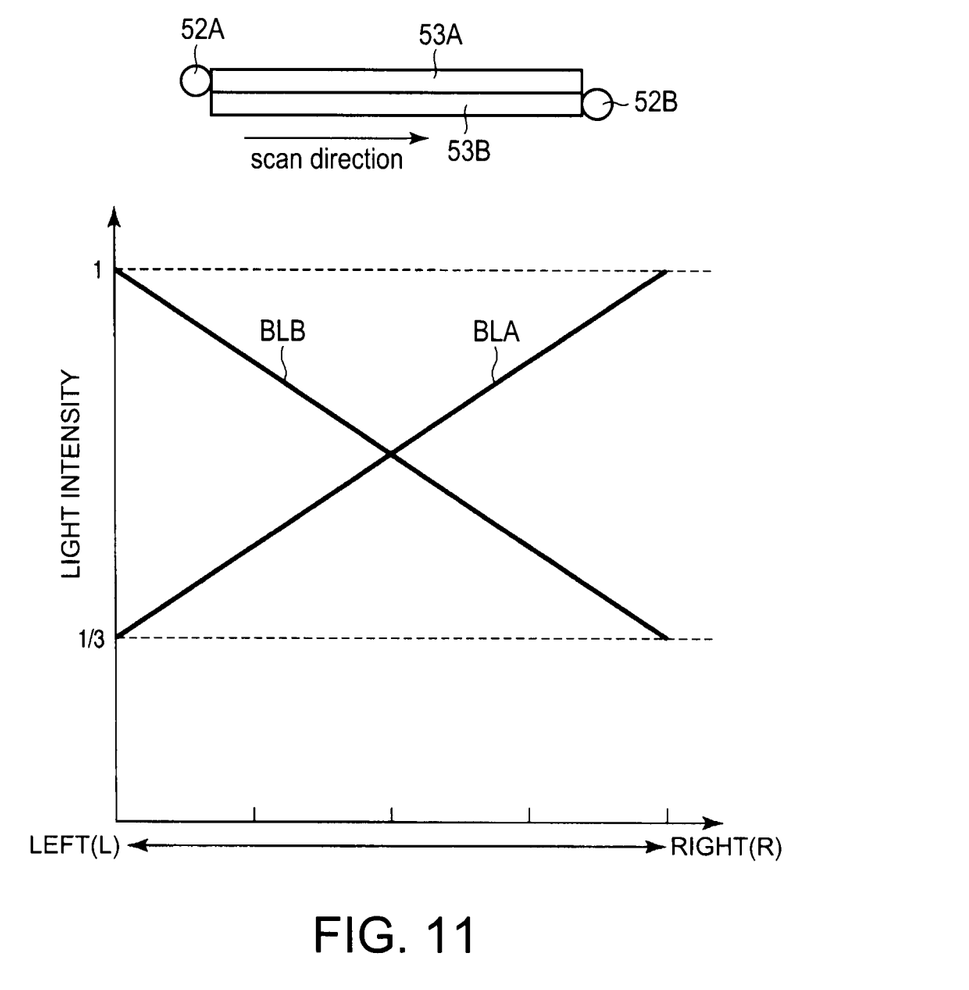
FIG. 11 is a figure for explaining other example of the characteristics of the light intensity of the light emitted from the back light.

In addition, in the 2D display according to the above mentioned first and second embodiments, the relationship among the gate scanning direction, the arrangement location of the light source, and the attenuation characteristics of the light intensity of the light source are defined, and it is a basic idea to light on the light sources in accordance with the scanning direction. Therefore, the timing to light on the light source is the same irrespective of the emitting direction of the back light, i.e., the emitting directions shown in FIG. 2 and FIG. 10. However, in case the attenuation direction is reversed as shown in FIG. 11, that is, the light source side is dark, and the scan terminating side is bright, it is desirable to inverse the lighting order with respect to the scanning direction. Of course, in case the scanning direction is reversed, it is also desirable to reverse the lighting direction. Accordingly, if a function to reverse the scanning direction in the panel is equipped, it is also desirable to add a function for reversing the lighting order.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display device for displaying a 3D display and a 2D display, comprising:
   a display panel including an array substrate, a counter substrate, a liquid crystal layer held therebetween, and a plurality of pixels arranged in a matrix; and
   a lighting device to illuminate the display panel; wherein
   the array substrate includes a plurality of gate lines extending in a column direction and a plurality of source lines in a row direction along which the plurality of pixels are arranged, and a driving device for sequentially driving the gate lines,
   the lighting device includes a first lighting unit, a second lighting unit, and a lighting driver to light on and light off the first and second lighting units independently,
   the first lighting unit includes a first light source arranged on a scanning starting side of the gate lines and a first light guide plate for emitting light from the first light source to the display panel,
   the second lighting unit includes a second light source arranged on a scanning terminating side of the gate lines and a second light guide plate for emitting light from the second light source to the display panel,
   in the 2D display operation, the lighting driver lights on the second lighting unit after lighting on the first lighting unit and during lighting on the first lighting unit, and lights off the second lighting unit after lighting off the first lighting unit in a period between a starting time to write a first signal and a finishing time to write a second signal in the plurality of pixels, and
   in the 3D display operation, the lighting driver lights on the first lighting unit and the second lighting unit by turns.

2. The liquid crystal display device according to claim 1, wherein
   the first lighting unit is configured so that the light intensity of the first lighting unit becomes gradually weaker toward the scanning terminating side from the scanning starting side of the plurality of gate lines, and
   the second lighting unit is configured so that the light intensity of the second lighting unit becomes gradually weaker toward the scanning starting side from the scanning terminating side of the plurality of gate lines.

3. The liquid crystal display device according to claim 1, wherein
   the first and second light sources respectively include a plurality of light emitting diodes.

4. The liquid crystal display device according to claim 1, wherein
   the liquid crystal layer is formed of OCB mode liquid crystal, the first signal is an image signal for a 2D display, and the second signal is an inverse transition prevention signal.

5. A method of controlling a liquid crystal display device for displaying a 3D display and a 2D display by switching, and including a display panel having first and second substrates, a liquid crystal layer held therebetween, a matrix of pixels, gate lines and signal lines, a first lighting unit with a light source arranged on a scanning starting side of the gate lines and a first light guide plate for emitting light from the first light source to the display panel, and a second lighting unit with a light source arranged on a scanning terminating side of the gate lines and a second light guide plate for emitting light from the second light source to the display panel, comprising:
   lighting on the second lighting unit after lighting on the first lighting unit and during lighting on the first lighting unit in a period between a starting time to write a first signal and a finishing time to write a second signal in the plurality of pixels in the 2D display operation,
   lighting off the second lighting unit after lighting off the first lighting unit in the 2D display operation, and
   lighting on the first lighting unit and the second lighting unit by turns in the 3D display operation.

6. The method of controlling a liquid crystal display device according to claim 5, wherein
   the first lighting unit is configured so that the light intensity of the first lighting unit becomes gradually weaker toward the scanning terminating side from the scanning starting side of the plurality of gate lines, and
   the second lighting unit is configured so that the light intensity of the second lighting unit becomes gradually weaker toward the scanning starting side from the scanning terminating side of the plurality of gate lines.

7. The method of controlling a liquid crystal display device according to claim 5, wherein
   the liquid crystal layer is formed of OCB mode, the first signal is an image signal for the 2D display, and the second signal is an inverse transition prevention signal to display a black image.

8. The method of controlling a liquid crystal display device according to claim 7, wherein after the 2D image is displayed by the first image signal written in the pixels, the displayed image is held in a predetermined time, and then the black image is displayed by the second signal.

9. The method of controlling a liquid crystal display device according to claim 5, wherein the first and second lighting units respectively include the light source formed of a light emitting diode.

* * * * *